United States Patent Office 3,488,385
Patented Jan. 6, 1970

3,488,385
PROCESS FOR THE PREPARATION OF ISOMALIC ACID THROUGH HYDROLYSIS OF 1-ACETOXY-1,1-DICYANOETHANE WITH STRONG MINERAL ACIDS
Luigi Marangoni, Limbiate, Milan, and Giovanni Cossi, Giuseppe Caprara, and Luigi Benedetti, Milan, Italy, assignors to Montecatini Edison S.p.A., Milan, Italy
No Drawing. Filed May 2, 1967, Ser. No. 635,373
Claims priority, application Italy, May 6, 1966, 17,597/66; May 17, 1966, 17,948/66
Int. Cl. C07c 59/12
U.S. Cl. 260—535
15 Claims

ABSTRACT OF THE DISCLOSURE

A process for the preparation of isomalic acid by hydrolyzing 1-acetoxy-1,1-dicyanoethane with an aqueous solution of a strong mineral acid, neutralizing excess strong mineral acid present, extracting the reaction mixture with at least one organic solvent having a boiling point not in excess of 100° C., and thence recovering said isomalic acid. When hydrochloric acid is employed as the strong mineral acid, the neutralization parameter may be replaced by a simple distillation.

BACKGROUND OF THE INVENTION

The present invention relates to a process for the preparation of isomalic acid or methyltartronic acid or hydroxyisosuccinic acid through the acid hydrolysis of 1-acetoxy-1,1-dicyanoethane. Isomalic acid,

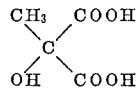

or methyltartronic acid is known, but until now it had not been seriously considered from a standpoint of practical application because it could only be obtained via complicated processes or by starting from raw materials that were not readily available and, hence, was generally quite costly to obtain.

The actual practical applications of isomalic acid are quite considerable and have been particularly studied in fields where use of other organic oxyacids had diffused, as, for example, in the field of foodstuffs, where it may be used as acidulant, for instance, for beverages, jams, fruit juices and syrups, etc. In fact, isomalic acid exhibits toxicological and organolectic characteristics well suited for such uses.

Another field of application of some importance is that of descaling and pickling metal surfaces, such as, for instance, steam generators, etc., in total or partial substitution for the inorganic acids (hydrochloric, sulfuric acid, etc.) and/or of the organic acids (citric, glycolic, tartaric, etc.) used normally, and in comparison with which isomalic acid has proved to be superior, so far as its effectiveness and rapidity of action are concerned.

Finally, there exist excellent possibilities for the appliance of isomalic acid to the field of reticulating or "cross-linking" substances and of adhesive compounds, and in the field of the non-toxic plasticizers for polyvinyl chloride.

From all of the above, it appears quite evident from the growing interest of late in such compound, also with respect to the broadening of requirements in various technological fields, that a particularly simple and economically feasible process for the production of isomalic or methyltartronic acid is a desideratum in the art.

There are known different processes for the preparation of isomalic acid.

This acid can, in fact, be obtained from $a$-cyanolactic acid by heating the same with concentrated HCl; or from $a$-bromoisosuccinic acid by treatment thereof with silver oxide or with barium hydroxide.

Isomalic acid may also be obtained from butyric acid by oxidation with $KMnO_4$, of from 2-cyano-2-hydroxy-propionamide with concentrated HCl, and with still other processes.

All of the foregoing processes have not been widely used in industry because they involve considerable technical difficulties in their operation, as well as difficulties of an economic nature, both due to the limited availability and difficultly obtainable raw materials, as well as because the processing conditions foresee the observance of parameters of little practicality and, finally, also because the yields obtainable with some of the known processes are rather low and, therefore, such processes do not offer sufficient industrial interest.

It is also known to prepare isomalic acid by treatment of 1-acetoxy-1,1-dicyanoethane with saturated HCl at 0° C.

This process consists essentially in saponifying 1-acetoxy-1,1-dicyanoethane by prolonged treatment at 0° C. with a saturated aqueous solution of HCl at 0° C., and by the subsequent dilution of the reaction mixture with water followed by a heat treatment.

The reaction mixture is then evaporated to dryness and thence extracted with ethyl ether in order to separate the ammonium chloride insoluble in ether, and finally the ethereal solution is evaporated to obtain isomalic acid. The yield according to this process amounts to about 77%.

The above described process, however, is of difficult realization, especially on an industrial level, because it presents several drawbacks: in fact, it requires a long time for its execution; and furthermore, it is constituted by rather complex and delicate phases owing to the need for maintaining low temperatures and because of the subsequent extractions and evaporations.

From the above, it turns out to be a laborious process in which the quantities of necessary reactants are rather high in relation to the potential productive capacity, while proportionally equally high are the losses; all circumstances that lower the yield of the process to values of little interest.

Furthermore, in the said process in practice it is not possible to recover the acetic acid that is formed as a by-product, and this constitutes a burden of considerable importance insofar as economical convenience of the process is concerned.

It is also known to treat 1-acetoxy-1,1-dicyanoethane with $H_2SO_4$ at −20° C., but under these conditions there was obtained acetoxy-isosuccinodiamide, along with a substantial repetition of the drawbacks already mentioned as regards the process by hydrolysis with HCl.

By operating according to the process of this invention, it is now possible to effectively obviate this drawback.

As a matter of fact it has surprisingly been found that, if the hydrolysis of 1-acetoxy-1, 1-dicyanoethane is carried out with aqueous solutions of HCl or $H_2SO_4$, under particular conditions of concentration of reactants and of temperature, it is possible to obtain and isolate isomalic acid in a simple, rapid process with high yields in comparison to corresponding known techniques. For this purpose it is necessary to carry out the acid hydrolysis at a temperature which, though being sufficient for promoting the hydrolysis reaction with the necessary speed, and in order to avoid decomposition of 1-acetoxy-1,1-dicyano-ethane into acetic and hydrocyanic acids does not attain in the meantime such values as to provoke the decarboxylation of the isomalic acid obtained thus leading to lactic acid, a phenomenon that may occur quite readily.

The 1-acetoxy-1,1-dicyanoethane starting material of the process for the production of isomalic acid according to this invention may be obtained through different techniques. For instance, from hydrocyanic acid and acetic anhydride or from ketene and hydrocyanic acid in the presence of basic catalysts, according to known processes and, thus, it represents an available raw material readily available in great quantities and at a reltively low cost.

Thus, an object of this invention is that of providing a simple, practical and inexpensive process for the preparation of isomalic acid through acid hydrolysis with an aqueous solution of sulfuric or of hydrochloric acids of 1-acetoxy-1,1-dicyanoethane, a compound readily retrievable and widely available.

Another object of this invention is that of providing a process for the preparation of isomalic acid, and together therewith there is rendered possible the recovery of acetic acid which is formed during the acid hydrolysis of 1-acetoxy-1,1-dicyanoethane, which represents a further substantial technical and economical advantage.

Still another object is that of providing a process for the preparation of isomalic acid through the acid hydrolysis of 1-acetoxy-1,1-dicyanoethane, which process is particularly free of the decarboxylation phenomenon of the isomalic acid produced and/or from the formation of intermolecular condensation products that may pollute the isomalic acid obtained, such as, for instance, diisomalic acid, dilactic acid, trilactic acid, etc.

THE INVENTION

These and still other objects, which will become more readily apparent to the skilled artisan from the following detailed description, are conveniently attained through a process for the production of isomalic acid by the acid hydrolysis of 1-acetoxy-1,1-dicyanoethane, characterized in that the 1-acetoxy-1,1-dicyanoethane is reacted with an aqueous solution of sulfuric or hydrochloric acid at a concentration comprised between 25% and 80% by weight, in a molar ratio of from 2 to 4 moles of sulfuric or hydrochloric acid for 1 mole of 1-acetoxy-1,1-dicyanoethane, at a temperature comprised between 45° C. and 90° C. and that, at the end of the hydrolysis the free sulfuric or hydrochloric acid is salified and the reaction mixture is subjected to extraction at a temperature ⩽60° C. with at least one organic solvent having a boiling point not exceeding 100° C. selected from the group consisting of alkyl ethers, saturated and unsaturated aliphatic alcohols having from 2 to 20 carbon atoms, aliphatic ketones and esters of carboxylic acids, the isomalic acid then being recovered from the solution in said organic solvent by evaporation of the solvent or by concentration followed by crystallization.

According to this invention, it is also possible to recover from the solution in the organic solvent the acetic acid that forms as a by-product during the acid hydrolysis. It may be recovered according to known techniques as, for instance, distillation under atmospheric pressure or under reduced pressure.

According to a preferred form of embodiment of this invention, the process may be advantageously conducted by carrying out the acid hydrolysis by heating the 1-acetoxy-1,1-dicyanoethane with an aqueous solution of sulfuric or hydrochloric acid at a concentration by weight comprised respectively between 40% and 80%, but preferably between 45% and 70% for the sulfuric, and between 25% and 40%, but preferably between 27% and and 37%, for hydrochloric acid.

It was found that the more the acid was concentrated, the faster was the hydrolysis, all other reaction conditions remaining the same.

The quantity of sulfuric or hydrochloric acid used, must be comprised between 2 and 4 moles for one mole of 1-acetoxy-1,1-dicyanoethane, however, it is preferred to operate with a quantity comprised between 2 moles and 3 moles per one mole of 1-acetoxy-1,1-dicyanoethane.

The temperature at which, according to this invention, the acid hydrolysis is carried out is comprised between 45° C. and 90° C., though best results are obtained when operating in the temperature range comprised between 45° C. and 75° C. for hydrochloric and between 50° C. and 90° C. for sulfuric acid; with the preferred ranges being respectively between 50° C. and 60° C. and between 60° C. and 80° C.

As a matter of fact, at temperatures lower than 60° C. for sulfuric and lower than 50° C. for hydrochloric, the speed of the hydrolysis of 1-acetoxy-1,1-dicyanoethane decreases gradually, while at temperatures higher than 80° C. and 60° C. respectively, there occurs a considerable increase both in the degree of decarboxylation of the isomalic acid formed, which turns into lactic acid, as well as in the formation of intermolecular condensation products (such as, for instance, diisomalic acid, dilactic acid, trilactic acid, etc.).

As far as the duration of the hydrolysis reaction is concerned, this will obviously depend on the concentration of the acid used and on the temperature at which one operates.

For purposes of illustration when using $H_2SO_4$ having a concentration by weight of 66%, the hydrolysis reaction will be complete, at a temperature of 75° C. in about 3½ hours, while with a concentration of sulfuric acid of 46% by weight and at the same temperature, the completion of the hydrolysis reaction will be attained in about 5 hours. Similarly, when using HCl at 37% by weight with a ratio of 3.5 moles of HCl for 1 mole of 1-acetoxy-1,1-dicyanoethane, the hydrolysis is completed at 60° C. in about 3 hrs., while at 40° C. it is completed in about 14 hrs.; with a concentration of acid equal to 27% by weight and at 60° C., the time required by the hydrolysis will be of about 4½ hours.

A variation in this phase suited for considerably improving conditions for industrial application of the process, and which proved to be particularly advantageous, consists in carrying out the hydrolysis with sulfuric acid in two consecutive stages or steps, wherein the first stage a more dilute $H_2SO_4$ is used, for instance at a concentration of from about 45% to 50%, while in the second stage the $H_2SO_4$ is used at the above preferred concentration of from 45% to 70% by adding concentrated $H_2SO_4$, for instance at 96%.

More particularly, according to this variation, the 1-acetoxy-1,1-dicyanoethane is first heated to a temperature of from 60° to 70° C., with an aqueous solution of $H_2SO_4$ at a concentration by weight of from 45% to 50% for about 1½ hours and at a molar ratio of 1 mole of $H_2SO_4$ for one mole of 1-acetoxy-1,1-dicyanoethane, and thereupon, in the second step, $H_2SO_4$ at 96% is added in a quantity sufficient to bring about complete and sufficiently rapid hydrolysis, that is, at least another 1.4 moles of $H_2SO_4$ per mole of 1-acetoxy-1,1-dicyanoethane are added.

This manner of operating affords considerable advantages, especially because it permits a better and more precise control of temperatures, a factor of greatest importance, given the heavy exothermicity of the reaction, which is around −81 Kcal. per mole of isomalic acid, thereby considerably facilitating conducting the reactions in simple industrial equipment.

This variation in the process, when using hydrochloric acid, consists in admixing the 1-acetoxy-1,1-dicyanoethane to the aqueous solution of hydrochloric acid having a concentration by weight of 30%–37% and with a ratio of 2 moles of HCl per 1 mole of 1-acetoxy-1,1-dicyanoethane, while maintaining the temperature at 60° C. and in introducing then gaseous HCl until saturation of the reaction mixture is reached, and in completing the hydrolysis, always maintaining the temperature at 60° C., in a time of about 5 hours from the start of the admixing of 1-acetoxy-1,1-dicyanoethane.

The salification of the free sulfuric or hydrochloric acid at the termination of the hydrolysis is carried out by admixing with the reaction mixture anhydrous ammonia, alkali metal hydroxides and/or alkaline-earth metal hydroxides, alkali metal and alkaline-earth metal carbonates, alkali metal bicarbonates, or any other compound that will permit the salification of the present free acid without thereby giving rise to the formation of compounds capable of compromising and/or hindering the separation of the isomalic acid.

The quantity of salifying agent to be used must be stoichiometrically sufficient for neutralizing the free sulfuric acid (as bisulfate or as neutral sulfate, for instance, $NaHSO_4$ or $CaSO_4$), and the hydrochloric acid, and the neutralization is generally carried out at a temperature comprised between 20° C. and 80° C. when sulfuric acid is used and comprised between 20° C. and 60° C. when hydrochloric acid is used.

The separation from the hydrolysis mixture of the isomalic acid formed and, also in the case of the acetic acid that is formed as a by-product, is carried out by extraction with at least one organic solvent selected from the group of compounds consisting of alkyl ethers, saturated and unsaturated aliphatic alcohols having from 2 to 20 carbon atoms, aliphatic ketones, esters of carboxylic acids, all of them having a boiling point not exceeding 100° C., such as, for instance, ethyl ether, isopropyl ether, isopropyl alcohol, secondary butyl alcohol, tertiary butyl alcohol, acetone, methylethylketone, methyl acetate, ethyl acetate, etc.

Said extraction is preferably carried out at a temperature comprised between 20° C. and 60° C.

The separation of the isomalic acid from the solution in the organic solvent, which solution also contains the acetic acid, is obtained by concentration at atmospheric pressure or at a reduced pressure and at a temperature not exceeding 65° C. This concentration may be carried through to dryness, or also it may be brought to a point sufficient to allow crystallization by cooling of the greatest part of the isomalic acid, while, in this case, the mother liquors are further concentrated in order to afford further isomalic acid, or they may also be re-cycled for successive extractions.

The crude isomalic acid thus obtained may be purified, for instance, by re-crystallization from water or from other organic solvents, such as acetic acid, etc., or by washing with at least one of the above mentioned solvents or with at least one chlorinated aliphatic or aromatic solvent such as, for instance, $CH_2Cl_2$, $CHCl_3$, $CCl_4$, $C_2H_4Cl_2$, trichloroethylene, chlorobenzene, etc.

The acetic acid formed during the hydrolysis may be recovered by fractional re-distillation of the distillate obtained during the concentration of the solution in the organic solvent.

According to another variation of the process of this invention, there may also be carried out by following up the hydrochloric acid hydrolysis of the 1-acetoxy-1,1-dicyanoethane with a complete distillation at a reduced pressure and at a temperature below 65° C., of the water, of the acetic acid, and of the hydrochloric acid, and with a subsequent extraction with an organic solvent of the solid residue thus obtained.

The isomalic acid may be recovered from the organic solution by evaporation of the solvent and, in this case, may be purified as above described.

If such a variation is applied, the acetic acid may be recovered from the distillate obtained during the concentration of the reaction mixture.

In order to further illustrate the present invention and the advantages thereof, the following specific examples are given, it being understood that the same are merely intended to be illustrative and not limitative.

EXAMPLE 1

Into a 5 litre flask provided with a mechanical stirrer, a reflux cooler and a dropping funnel, 1000 gr. of 1-acetoxy-1,1-dicyanoethane and 1535 gr. of sulfuric acid at 46% by weight were introduced. This mixture was heated at 75° C. and the reaction mass was kept at this temperature for 1½ hours. Thereupon, through the dropping funnel, 1070 gr. of sulfuric acid at 96% were introduced at such a speed as to avoid the temperature exceeding 75° C. The entire mass was then maintained under stirring at the same temperature for 4½ hours further. Thereupon, 160 gr. of sodium carbonate were added at 60°–70° C. and, after cooling to 40°–50° C., the reaction mass was extracted four times using 1600 ml. of ethyl ether each time.

After evaporation of the solvent and washing of the residue with 1000 ml. of methylene chloride, 860 gr. of isomalic acid were obtained by drying, and this isomalic acid had a purity of 97.2% (acidimetric titration) and a melting point (M.P.) of from 139° to 140° C., while the yield was 85.9%.

EXAMPLE 2

Into a 3 litre flask, provided with a reflux cooler and a mechanical stirrer, there were introduced in the following order:

| | Gr. |
|---|---|
| 1-acetoxy-1,1-dicyanoethane | 400 |
| Water | 160 |
| Sulfuric acid at 77% | 874 |

The temperature of this mass was brought up to 70° C. and was then maintained at this value for 5 hours. After salification with 48 gr. of NaOH, the mass was extracted 5 times using 700 ml. of ethyl ether each time.

After evaporation of the ethereal solution and washing of the residue with 500 ml. of trichloroethylene, 332 gr. of isomalic acid were obtained, which showed an acidimetric titre of 97% and a melting point of from 138° to 139° C., while the yield was 83%.

EXAMPLE 3

Into an enameled Pfaudler reactor having a holding capacity of 40 litres, provided with a stirrer and a heating-cooling jacket, 9300 gr. of 1-acetoxy-1,1-dicyanoethane were introduced having a moisture content of 15%, and 11 kgr. of sulfuric acid at 51.5%. The entire mass was then heated to 75° C. for 1½ hours. Thereupon, 8560 gr. of sulfuric acid at 96% were added and the mass was then maintained at 75° C. for another 4 hours. The sulfuric acid in excess was salified with 1375 gr. of sodium carbonate. The extraction of the isomalic acid was carried out by using ethyl acetate (4 extractions with 16 lt. of solvent for each extraction), at 40° C.–50° C.

The processing of the extract was carried out in two different ways:

(1) 34 lt. of the solution, corresponding to theoretical 3840 gr. of isomalic acid, were evaporated at a reduced pressure and at a temperature not exceeding 60° C. The residue was digested by means of 4500 ml. of methylene chloride and then centrifuged. After drying, 3540 gr. of isomalic acid were obtained, which exhibited an acidimetric titre of 95.6% and a melting point of from 137° C. to 139° C., while the yield was 88.1%.

The distilled solvent was then fractioned at atmospheric pressure in order to recover the ethyl acetate and the acetic acid. From the 29,100 gr. of condensate obtained from the preceding distillation there were separated, by fractional distillation at atmospheric pressure in a filled-type column of 16 theoretical plates, a fraction of 22,150 gr. having a boiling point of from 77° C. to 78° C., constituted by a pure ethyl acetate and a fraction of 2626 gr. having a boiling point of from 118° to 119° C., being constituted by $CH_3$—COOH at 98%.

(2) 34 lt. of the above said solution were concentrated at a reduced pressure until reaching a weight of 5000 gr.

of residue, from which, through cooling at room temperature, by means of crystallization, 2770 gr. of isomalic acid were obtained which exhibited an acidimetric titre of 98% and a melting point of 140° C. to 2200 gr. of mother liquors were added 700 ml. of toluene; then the toluene was evaporated at a reduced pressure, without exceeding thereby the temperature of 60° C. This operation was repeated three times and, at the end, through crystallization, from the residue there were obtained 510 gr. of isomalic acid having an acidimetric titre of 94.2% and a melting point of from 136° to 137° C., while the total yield was 83.2%.

EXAMPLE 4

1535 gr. of sulfuric acid at 46% and 1000 gr. of 1-acetoxy-1,1-dicyanoethane were introduced into a 5000 ml. flask.

The mass temperature was then brought to 75° C. and maintained at this value for 1½ hours. Thereupon, 1020 gr. of sulfuric acid at 96% were added to this mass. The reaction was carried on for 4 hours at 75° C., after which time 160 gr. of $Na_2CO_3$ at about 50° C. were introduced into the reaction mass.

The reaction mass was then subdivided into two equal parts: (a) The first part was extracted three times at room temperature, with 1550 ml. of methylethylketone. After evaporation of the ketone solution at a reduced pressure, and after drying of the residue, 420 gr. of isomalic acid were obtained which exhibited an acidimetric titre of 91% and a melting point of from 133° to 134° C. with a yield of 79.2%.

The product was crystallized from water and gave isomalic acid with a melting pont of from 140° to 141° C. and an acidimetric titre of 98.3%.

(b) The second part was extracted at 45° C., three times with 1800 ml. each time of secondary butyl alcohol. After evaporation of the alcohol solution 405 gr. of crude isomalic acid were obtained which exhibited an acidimetric titre of 90.9% and a melting point of from 130° C. to 133° C. with a yield of 75.9%.

For the purification, 100 gr. of this crude product were dissolved in 150 ml. of acetic acid at 70° C. Through cooling there crystallized 62 gr. of isomalic acid exhibiting an acidimetric titre of 99% and a melting point of from to 140° to 141° C.

EXAMPLE 5

Into a 3 lt. flask, provided with a stirrer, there were introduced 2150 gr. of sulfuric acid at 66% by weight.

The mass in the flask was then brought to 55° C. and gradually there were introduced 500 gr. of 1-acetoxy-1,1-dicyanoethane. At the end of this operation the mass was maintained at 55° C. for 7 hours, after which there were added 384 gr. of $Na_2CO_3$.

The reaction mass was then extracted at 20° C. until exhaustion with ethyl ether, and after evaporation of the solvent, from the ethereal extract 445 gr. of product were obtained which exhibited a titre as isomalic acid of 97.4% and a melting point of from 139° C. to 140° C. with a yield of 89.4%.

EXAMPLE 6

Into a 5 lt. flask there were introduced 800 gr. of 1-acetoxy-1,1-dicyanethane and 2900 gr. of sulfuric acid at 55%.

This reaction mass was then brought to 75° C. and the temperature was maintained at that value for 8 hours. Thereupon, 260 gr. of trihydrate sodium acetate were added to the mass which was then extracted at room temperature with ethyl ether. Through evaporation of the solvent, 685 gr. of isomalic acid were obtained from the ethereal extract, having an acidimetric titre of 96% and a melting point of from 136° to 137° C., with a yield of 84.7%.

EXAMPLE 7

Into a 6 litre flask, provided with a mechanical stirrer and a reflux cooler, 2000 gr. of 1-acetoxy-1,1-dicyanoethane and 4320 gr. of hydrochloric acid at 36% were introduced.

This reaction mass was heated to 40° C.; at this temperature there started an exothermic reaction which could be readily controlled through external cooling, so as to maintain the temperature at 60° C. The reaction mass was maintained at this temperature for 4 hours. Then the excess hydrochloric acid was eliminated, as well as the water and the acetic acid formed, by evaporation at reduced pressure and at a temperaturer not exceeding 50° C. The residue was then taken up at 25° C. with ethyl ether (four times using 2500 ml. each time).

By evaporation of the ethereal solution, 1860 gr. of isomalic acid were obtained, having a degree of purity of 97.5% (acidimetric titre ) and a M.P. of from 138° C. to 140° C. with a yield of 93.4%.

The compound re-crystallized from water exhibited a M.P. of from 141° to 142° C. and an acidimetric titre of 100%.

EXAMPLE 8

Into a 5 litre flask, provided with a mechanical stirrer and a reflux-cooler, there were introduced in the following order: 750 ml. of water, 1000 gr. of 1-acetoxy-1,1-dicyanoethane and 2140 gr. of hydrochloric acid at 36%.

The temperature was then brought to 60° C. and was maintained at this value for 5 hours.

By proceeding as in Example 1, hydrochloric acid, water and acetic acid were eliminated and the isomalic acid was then extracted with methyl-ethyl ketone.

From the organic solution there were obtained by evaporation of the solvent 931 gr. of isomalic acid having a degree of purity of 93.2% (yield=89.4%) and a M.P. of from 135° to 136° C.

100 gr. of this product were purified by crystallization from 150 ml. of acetic acid at 70° C. Thereby 62 gr. of isomalic acid were obtained which had a titre=99% and a M.P. of from 140° to 141° C.

EXAMPLE 9

Into a 10 litre flask there were introduced 1500 gr. of water, 2000 gr. of 1-acetoxy-1,1-dicyanoethane and 4300 gr. of hydrochloric acid at 36%.

This reaction mixture was maintained at 60° C. for 4.5 hours, after which time the excess hydrochloric acid was neutralized at about 50° C. with 720 gr. of sodium carbonate. The reaction mass was thereupon subdivided into two equal parts:

(a) One part was continuously extracted in a suitable apparatus with ethyl ether until exhaustion of the reaction mass. After evaporation of the solvent, 945 gr. of isomalic acid were obtained, which had a purity degree of 96.2% and showed a M.P. of from 137° to 139° C. The yield was 93.5%.

(b) The other part was concentrated to dryness at a reduced pressure. An aqueous condensate was thus obtained from which, by fractional re-distillation, there were recovered acetic acid and a residue and from the latter the isomalic acid was extracted by means of ethyl acetate (5 times with 1000 ml. each time).

After evaporation to dryness of the organic solution and after washing of the residue with benzene, 910 gr. of isomalic acid were obtained, with an acidimetric titre of 96%, a M.P. of from 137° C. to 138° C. and a yield of 90%.

EXAMPLE 10

Into a 5 litre flask there were introduced 2140 gr. of hydrochloric acid at 36%. This was heated to 50° C. and 1000 gr. of 1-acetoxy-1,1-dicyanoethane were gradually added at such a speed as to avoid the temperature exceeding 60° C. Then, at this temperature, the heating was carried out for a total of 4 hours. The excess hydrochloric acid was then neutralized with 330 gr. of calcium carbonate. The mass was extracted six times with 1200 ml. of ethyl acetate each time. The organic solution was then concentrated at a reduced pressure until reaching about ⅕ of its initial weight, whereupon it was cooled to room temperature; by crystallization there were then obtained 795 gr. of isomalic acid having an acidimetric titre of 97.5% and a M.P. of from 140° C. to 141° C.

The distillate was then fractioned at atmospheric pressure in order to recover the ethyl acetate and the acetic acid. From 5250 gr. of condensate obtained in the preceding distillation there were separated, by fractional distillation at atmospheric pressure with a fluid-type column with 16 theoretical plates, a fraction of 3362 gr. with a boiling point from 77° to 78° C., constituted by ethyl acetate, and a fraction of 477 gr., having a boiling point of from 118° C. to 119° C., constituted by acetic acid at 98%. The mother liquors, 900 gr. were added with 600 ml. of toluene.

The toluene was then distilled at reduced pressure without exceeding 60° C. This operation was repeated three times. At the end, by crystallization of the concentrated solution 72 gr. of isomalic acid were further recovered, which had an acidimetric titre of 94.8% and a melting point of from 136° C. to 138° C. The total yield was 86.8%.

EXAMPLE 11

Into a 5 litre flask 800 gr. of 1-acetoxy-1,1-dicyanoethane and 2860 gr. of aqueous hydrochloric acid at 36% by weight were introduced. This reaction mass was then brought to 45°–50° C. and maintained at this temperature for seven hours, thereupon it was divided into two equal parts:

(a) One part was evaporated to dryness at a reduced pressure (15 mm. Hg, at 50° C.). Then the residue was extracted with secondary butyl alcohol (5 times with 2000 ml. each time), and the organic extract was evaporated at a reduced pressure thereby obtaining as a residue 371 gr. of isomalic acid having an acidimetric titre of 92.3% and a melting point of from 134°–136° C. The yield was 88.3%. The product crystallized from acetic acid exhibited an acidimetric titre of 99.3% and a melting point of from 141° to 142° C.

(b) For the second part, it was operated as in (a), carrying out the extraction with methylethylketone. In this manner there were obtained 390 gr. of isomalic acid with a titre of 92% and a melting point of from 132° to 133° C. The yield was 92.5%.

EXAMPLE 12

Into a 40 lt. enameled reactor of the Pfaudler type provided with a stirrer and a heating jacket, there were introduced 12.7 kg. of aqueous HCl at 31%, and then heated to 50° C. To this 8 kg. of 1-acetoxy-1,1-dicyanoethane were admixed in batches, avoiding allowing the temperature to rise above 60° C. Through the bottom of the reactor gaseous HCl was then introduced, taking care that the temperature did not exceed 60° C.

When the saturation in HCl of the reaction mass was attained, the introduction of the gaseous hydrochloric acid was stopped and the suspension was maintained at 60° C. for another 3 hours. Thereupon, by potentiometric titration with sodium acetate in an acetic acid medium, the free HCl was established and it was then salified with an equivalent quantity of $Na_2CO_3$ (kg. 2.750). From this the isomalic acid and the acetic acid were then extracted by means of ethyl acetate (5 extractions with 16 lt. for each extraction) and from the organic solution there was then separated isomalic acid by means of distillation to dryness at 60° C. and at the pressure of 50 mm. Hg. The residue was then taken up with 10 kg. of trichloroethylene and centrifuged and dried. There were thus obtained 7.540 kg. of isomalic acid with an acidimetric titre of 95% and a melting point of from 136° to 138° C., while the yield was 92.4%.

As many apparently widely different embodiments of the present invention can be made without departing from the spirit and scope thereof, it is to be understood that the same is not intended to be limited to the specific embodiments thereof, except as defined in the appended claims.

What is claimed is:

1. A process for the preparation of isomalic acid comprising hydrolyzing 1-acetoxy-1,1-dicyanoethane with an aqueous solution of a strong mineral acid, the concentration of the said acid being from between about 25 percent by weight to about 80 percent by weight, neutralizing excess strong mineral acid present, extracting the reaction mixture with at least one organic solvent having a boiling point not in excess of 100° C., and thence recovering said isomalic acid.

2. The process as defined by claim 1, wherein the said hydrolysis is effected at a temperature of from about 45° C. to about 90° C., the strong mineral acid is selected from the group consisting of sulfuric acid and hydrochloric acid, the concentration of the said acid is from between about 25 percent by weight to about 80 percent by weight and the said acid is present in an amount corresponding to between 2 and 4 moles per mole of 1-acetoxy-1,1-dicyanoethane, and further wherein the extraction is effected at temperatures of up to 60° C.

3. The process as defined by claim 2, wherein the organic solvent is selected from the group consisting of alkyl ethers, saturated and unsaturated aliphatic alcohols having from 2 to 20 carbon atoms, aliphatic ketones and carboxylic acid esters.

4. The process as defined by claim 3, wherein the strong mineral acid is sulfuric acid, the concentration thereof ranging from between about 40 percent and about 80 percent by weight, the hydrolysis is effected at temperatures of from about 50° C. to about 90° C., and the excess sulfuric acid is neutralized as a member selected from the group consisting of bisulfate and neutral sulfate at a temperature from between about 20° C. and 80° C.

5. The process as defined by claim 3, wherein the strong mineral acid is hydrochloric acid, the concentration thereof ranging from between about 25 percent and about 40 percent by weight, the hydrolysis is effected at temperatures of from about 45° C. to about 75° C., and the excess hydrochloric acid is neutralized at a temperature from between about 20° C. and 60° C.

6. The process as defined by claim 4, wherein the sulfuric acid hydrolysis is conducted in two stages.

7. The process as defined by claim 6, wherein the first stage of hydrolysis sulfuric acid having a concentration from between about 45 percent and about 50 percent by weight is employed, and wherein the second stage of hydrolysis concentrated sulfuric acid is added to adjust the overall sulfuric acid concentration to a value not in excess of 70 percent by weight.

8. The process as defined by claim 5, wherein the hydrochloric acid hydrolysis is conducted in two stages.

9. The process as defined by claim 8, wherein the first stage of hydrolysis hydrochloric acid having a concentration from between about 30 percent and about 37 percent by weight is employed, and wherein the second stage gaseous hydrogen chloride is introduced until the reaction mixture is saturated therewith and the hydrolysis is thence completed.

10. The process as defined by claim 3, wherein the isomalic acid is recovered by evaporating the organic solvent phase of the extraction to dryness.

11. The process as defined by claim 3, wherein the isomalic acid is recovered by concentrating the organic solvent phase of the extraction and thence crystallizing the said isomalic acid therefrom.

12. The process as defined by claim 3, wherein byproduct acetic acid is additionally recovered from the organic solvent phase of the extraction.

13. The process as defined by claim 4, wherein the hydrolysis is effected at temperatures of from between about 60° C. and about 80° C.

14. The process as defined by claim 5, wherein the hydrolysis is effected at temperatures of from between about 50° C. and about 60° C.

15. The process for the preparation of isomalic acid comprising hydrolyzing 1-acetoxy-1,1-dicyanoethane with an aqueous solution of hydrochloric acid, the concentration of the said acid being from between about 25 percent by weight to about 80 percent by weight, distilling under reduced pressure the products of hydrolysis, extracting the solid residue resulting from such distillation with at least one organic solvent having a boiling point not in excess of 100° C., and thence recovering said isomalic acid.

References Cited

K. Brimmer: Montasch. Chem., vol. 13, p. 835 (1892).
Nenz et al.: Chem. Ab., vol. 61: 4210–4211 (1964).

LORRAINE A. WEINBERGER, Primary Examiner

ALBERT P. HALLUIN, Assistant Examiner

U.S. Cl. X.R.

260—541